June 24, 1969  R. C. FITZGIBBONS  3,451,739

ADJUSTABLE FRICTION SLIP DRIVE FOR MICROSCOPES

Filed Oct. 25, 1966

United States Patent Office 3,451,739
Patented June 24, 1969

3,451,739
ADJUSTABLE FRICTION SLIP DRIVE FOR MICROSCOPES
Robert C. Fitzgibbons, San Jose, Calif., assignor to Swift Instruments Inc., Boston, Mass., a corporation of Massachusetts
Filed Oct. 25, 1966, Ser. No. 589,374
Int. Cl. G02b 21/24
U.S. Cl. 350—84                                    4 Claims

ABSTRACT OF THE DISCLOSURE

A microscope wherein a tapered, threaded split sleeve embraces a portion of the focusing shaft and a collar threaded on the sleeve is rotatable to compress said sleeve against the shaft with variable force to brake said shaft against rotation and including an adjustable friction drive connection between the focusing knob and focusing shaft adapted to slip to permit rotation of said knob without rotation of said shaft when the resistance to rotation of said shaft exceeds a predetermined amount.

---

The present invention relates to improvements in microscopes and more particularly to improvements in the focusing mechanism of microscopes.

The invention is applicable to microscopes which include a frame together with a specimen stage member and a lens member each supported on the frame, one of said members being movable on the frame relative to the other, and which further include a focusing mechanism operated by a hand knob for moving the movable member on the frame to various distances from the other member. The lens member and the stage are relatively heavy and when the operator's hand is removed from the focusing knob there is a tendency for the movable member to move downwardly under its own weight. Known microscopes incorporate mechanism for supplying resistance to such movement, which mechanism as heretofore known has been structurally somewhat complicated. Also, when the movable member is moved by turning of the focusing knob, provision must be made for avoiding damage to the focusing mechanism or other parts of the instrument by continued turning of the knob when the focusing mechanism has reached a limit of its travel. The invention provides improvements in both of these aspects of the microscope focusing mechanism.

An object of the invention is to provide in a microscope focusing mechanism a variable resistance to downward movement of such movable member under its own weight which is very simple in construction, and therefore inexpensive, and yet is highly reliable and efficient in use.

Another object of the invention is to provide an improved slip connection in the focusing mechanism drive of a microscope which will prevent damage to the instrument through any attempt to turn the focusing knob after the mechanism has reached an extreme of its normal travel which is simple in construction and reliable in use.

Figure 1:
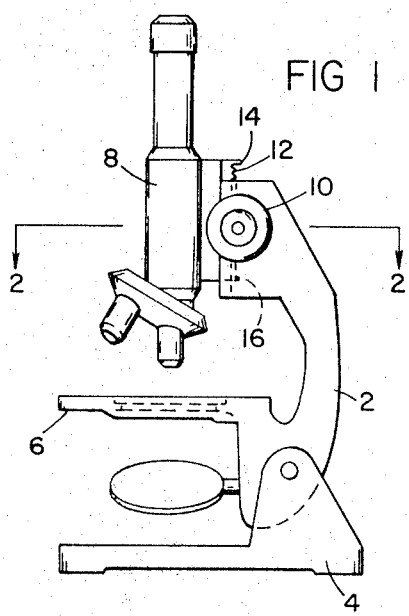
Figure 2:
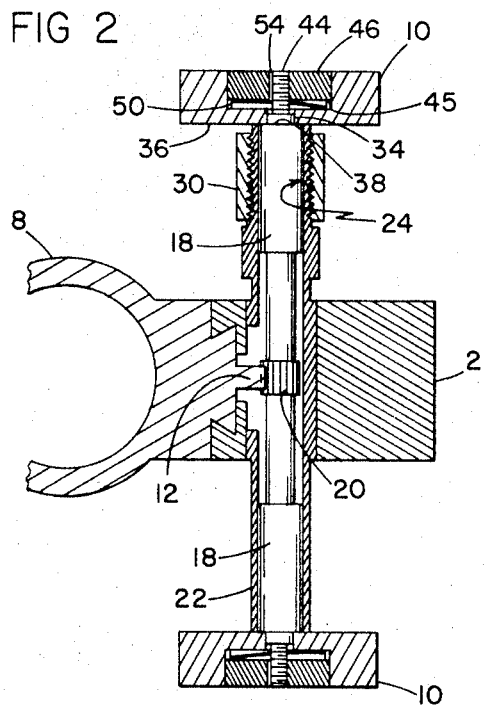
Figure 3:
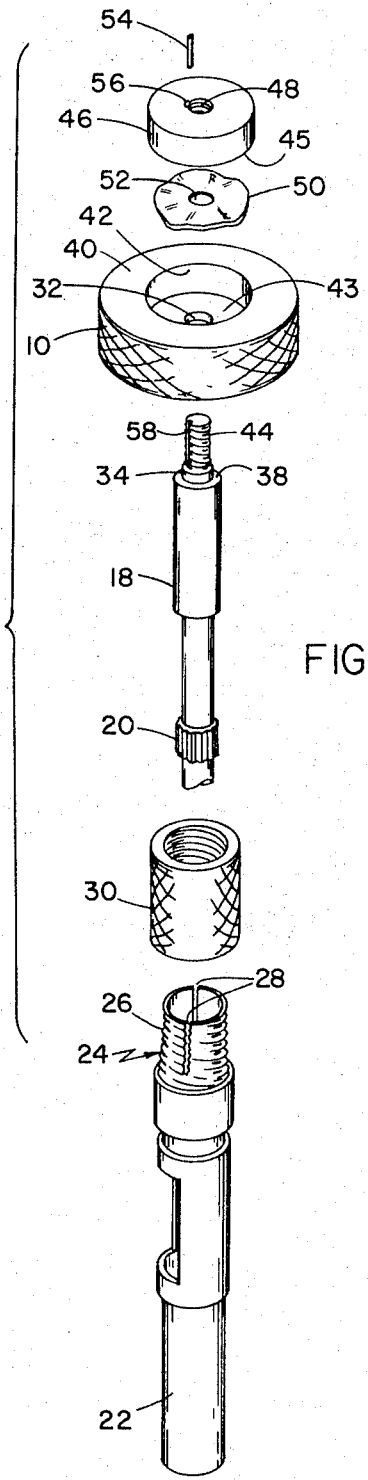

Other and further objects, features and advantages of the invention will become apparent from the following description of illustrative embodiments of the invention in which description reference is made to the accompanying drawing, wherein, FIG. 1 is an elevation of the microscope;
FIG. 2 is a horizontal sectional view taken on line 2—2 of FIG. 1, looking in the direction of the arrows; and
FIG. 3 is an exploded view of the focusing mechanism which appears in FIG. 2.

The invention comprises a microscope including a frame, cooperating lens and stage members supported on the frame with at least one of said members, preferably the lens member, being movable on the frame relative to the other member, a rotatable shaft journaled in the microscope, preferably in the frame, and having thereon drive means, such as a pinion, for moving the movable member on the frame upon rotation of the shaft, a split sleeve embracing a part of the shaft and fixed against rotation with respect to the frame, and means, such as a threaded collar, for adjustably compressing the sleeve against the shaft to brake said shaft against rotation. The invention also includes a friction drive connection between the shaft and a focusing knob on the shaft for rotating the shaft upon rotation of the knob and adapted to slip to permit rotation of the knob without rotation of the shaft when the resistance to rotation of the shaft exceeds a predetermined amount, as when the movable member has reached a limit of its travel. To provide such friction drive connection, the knob is provided with a frictional surface thereon and is arranged to be mounted on the shaft for free rotation on the shaft without endwise movement thereon, and a friction member having a frictional surface is provided on the shaft and normally rotatable with the shaft, together with an expansible friction element, such as a wave washer, interposed between and engaging both said frictional surfaces. Preferably the friction drive is adjustable to vary the force required to cause it to slip, and preferably the friction member, such as a nut, is threaded on the shaft for movement longitudinally of the shaft toward and from the frictional surface on the knob to vary the spacing between the frictional surfaces to predetermine the force required to cause the knob to slip relative to the shaft. Preferably means is provided for fixing the nut in its adjusted position.

Referring now to the drawing, the microscope of the illustrative embodiment comprises a frame 2 including a base member 4 for supporting the instrument on a supporting surface. Mounted on the frame 2 is a stage 6 for supporting the object to be viewed, such as a conventional glass slide. Also supported on the frame 2 is a conventional lens member 8 comprising the optical components of the microscope. Either or both of the stage and lens members is adjustable on the frame for focusing and other purposes. In the embodiment selected for purposes of illustration the lens member 8 is adjustable on the frame 2 for movement with respect to the stage 6, such adjustment being effected by hand rotation of a focusing knob 10 which, through appropriate mechanism to be described, operates a rack 12 to move the lens member 8 upwardly or downwardly.

Movement of the rack 12 with respect to the frame 2 is limited by a stop 14 fixed on the lens member 8 and engaging the frame 2 when the lens member 8 reaches one extreme of its travel, and by a similar stop 16 which engages the frame when the lens member reaches its other extreme of travel. An attempt to turn the focusing knob 10 after one or the other stop 14, 16 has engaged the frame could cause damage to the focusing mechanism and the invention provides simple mechanism for avoiding such damage, as will be described hereinafter.

When the focusing knob 10 is released, the weight of the lens member 8 tends to cause the same to move downwardly, which could disturb the sharpness of focus, which undesired movement is prevented by the simple resistance arrangement provided by the invention, as will be described.

Referring now particularly to FIGS. 2 and 3, the focusing mechanism includes a rotatable shaft 18 on which is fixed a pinion 20 for engagement with the rack 12 to raise or lower the optical member 8 upon rotation of the shaft 18. The shaft 18 is rotated by hand movement of the focusing knobs 10 connected to the shaft at its opposite ends in a manner which will be described in detail hereinafter. The shaft 18 is supported on the frame 2 for rotation thereon by being journaled as shown in a generally tubular member 22 which passes through and is fixed in the frame 2. One end of the tubular member 22 is in the form of an externally threaded, longitudinally tapered split sleeve 24 having an external tapered thread 26 thereon and containing slots 28 which permit the sleeve to expand and contract. Threaded on the sleeve 24 is an internally tapered and threaded collar 30. Rotation of the collar 30 on the split sleeve 24 in the direction to move the collar further on to the sleeve causes the sleeve to be compressed against the shaft 18 to exert a braking effect to impede rotation of the shaft. Rotation of the collar 30 in the opposite direction permits the split sleeve 24 to expand and lessen the braking effect. Thus undesired rotation of the shaft 18 due to the tendency of the lens member 8 to move downwardly under its own weight and drive the shaft through the rack 12 and pinion 20 can be prevented by tightening of the collar 30. The operator can tighten or loosen the collar 30 to adjust the resistance to rotation of the shaft 18 and knob 10 to the degree that best suits his own personal preference. Wear on the shaft 18 or the inner surface of the split sleeve 24 can be compensated for by tightening the collar 30. No tools are required to adjust the resistance adjustment. The resistance adjustment thus provided is extremely simple, but dependable, and is convenient to use as the collar 30 is located close to the focusing knob 10 where it is readily accessible. The opposite end of the tubular member 22 can, if desired, be provided with a similar resistance adjustment.

The adjustable friction drive connection between each focusing knob 10 and the shaft 18 is provided as follows, the construction and operation being the same for each knob. The focusing knob 10 is provided with a central bore 32 which is received on a reduced end portion 34 of the shaft 18 with a fit permitting free rotation of the knob on the shaft. The inner face 36 of the knob 10 seats on a shoulder 38 on the shaft 18. In the opposite face 40 of the knob 10 is a counterbore 42 into which extends a reduced and threaded portion 44 of the shaft 18. The counterbore 42 has a flat bottom 43 providing a frictional surface. A friction member in the form of a nut 46, having a central threaded bore 48 for the reception of the threaded portion 44 is threaded on the portion 44 and is received within the counterbore 42, with its inner surface 45 providing a frictional surface. A frictional element in the form of a wave washer 50 is disposed as shown inside the counterbore 42 between the nut 46 and the bottom 43 of the counterbore, the reduced threaded portion 44 of shaft 18 passing through a central aperture 52 in the wave washer 50. The focusing knob 10 thus is rotatable on shaft 18 except as its rotation with respect to the shaft is restrained by the frictional engagement of the wave washer 50 with the inner face 45 of the nut 46 and the bottom 43 of the counterbore 42. The degree of frictional resistance to rotation of knob 10 on shaft 18 can be adjusted by rotation of the nut 46 to provide lesser or greater compression of the wave washer 50. The nut 46 may be fixed in adjusted position by insertion of a pin 54 into a slot 56 in the bore 48 of the nut 46 and a cooperating groove 58 in the reduced threaded portion 44 of shaft 18.

Thus the resistance to turning movement between the knob 10 and shaft 18 may be adjusted so that in all normal use of the microscope the shaft 18 turns with the knob 10 when the latter is turned by hand but when unusual resistance to rotation of shaft 18 occurs, as when the lens member 8 reaches a limit of its travel, the knob 10 slips on the shaft 18 so that continued rotation of the knob 10 does not turn the shaft 18 and damage to the rack 12 or pinion 20 or other parts of the microscope is prevented. Ordinarily the operator does not care to adjust the degree of frictional engagament of the knob 10 with the shaft 18 and so, once the nut 46 is satisfactorily adjusted, further adjustment is not required. If any such further adjustment should be desired the pin 54 may be removed, the nut 46 adjusted by one or more turns and the pin 54 reinserted.

It will be seen from the foregoing that the invention has provided a simple and effective mechanism whereby a desired degree of resistance to turning of the focusing shaft 18 may be conveniently provided by the operator. Such adjustment can be made from time to time by the operator as desired and without the use of tools. The invention further has provided a simple and reliable construction preventing damage to the focusing mechanism or other parts of the microscope through any excessive turning force which may inadvertently be applied to the focusing knob 10.

While particular specific embodiments of the invention have been described and shown in detail for purposes of disclosure of the invention, the invention is not confined thereto but includes all modifications and variations falling within the scope of the following claims.

I claim:

1. A microscope comprising a frame, cooperating lens and stage members supported on said frame, at least one of said members being movable on said frame relative to the other member, a rotatable shaft having thereon drive means for moving said movable member on said frame upon rotation of said shaft, a tapered, externally threaded split sleeve embracing a portion of said shaft and fixed against rotation with respect to said frame, means for adjustably compressing said sleeve against said shaft to resist rotation of said shaft, means cooperating with said tapered sleeve for adjusting the compressive force exerted by said compressing means to vary the resistance to rotation provided by said sleeve, a hand operated knob mounted on said shaft for free rotation on said shaft without endwise movement thereon, a friction drive connection between said knob and said shaft for rotating said shaft upon rotation of said knob and adapted to slip to permit rotation of said knob without rotation of said shaft or endwise movement of the knob on the shaft when the resistance of said shaft to rotation in either direction exceeds a predetermined amount.

2. The microscope of claim 1 further characterized in that said means cooperating with said tapered sleeve comprises a collar threaded on said shaft.

3. The microscope of claim 1 further characterized in that said friction drive connection between said knob and said shaft includes a nut threaded on said shaft and normally stationary thereon, means for releasably fixing said nut against rotation on said shaft, and a flexible expansible spring washer disposed between said knob and nut and having one face in frictional engagement with a face of the nut and its other face in frictional engagement with a face of said knob thereby providing an adjustable friction drive between said knob and shaft upon rotation of said knob and adapted to slip to permit rotation of said knob without rotation of said shaft when the resistance of said shaft to rotation exceeds a predetermined amount.

4. The microscope of claim 3 wherein said nut upon release of said fixing means is rotatable on said shaft and is thereby adjustable longitudinally of the shaft toward and from said knob to vary the expansive force exerted by said washer.

References Cited

UNITED STATES PATENTS

| | | | |
|---|---|---|---|
| 1,968,094 | 7/1934 | Ott | 350—84 |
| 2,251,739 | 8/1941 | Huntsinger | 350—84 |
| 2,560,169 | 7/1951 | Gradisar | 350—84 |
| 2,820,396 | 1/1958 | Pressey | 350—84 |
| 3,260,157 | 7/1966 | Boughton | 350—84 |

FOREIGN PATENTS 409,245  4/1934  Great Britain.

DAVID SCHONBERG, *Primary Examiner.*

PAUL R. GILLIAM, *Assistant Examiner.*